United States Patent
Duvauchelle (10) Patent No.: US 12,220,077 B2
(45) Date of Patent: Feb. 11, 2025

(54) PUMPKIN SCRAPING AND SCOOPING TOOL

(71) Applicant: Eric Georges Duvauchelle, Temecula, CA (US)

(72) Inventor: Eric Georges Duvauchelle, Temecula, CA (US)

(*) Notice: Subject to any disclaimer, the term of this patent is extended or adjusted under 35 U.S.C. 154(b) by 309 days.

(21) Appl. No.: 17/712,534

(22) Filed: Apr. 4, 2022

(65) Prior Publication Data

US 2023/0309732 A1    Oct. 5, 2023

(51) Int. Cl.
*A47J 17/02* (2006.01)

(52) U.S. Cl.
CPC ................... *A47J 17/02* (2013.01)

(58) Field of Classification Search
CPC .......................................... A47J 17/02
USPC ................... 30/136, 169; 15/236.01, 236.02, 15/236.05–236.9; D7/680–696
See application file for complete search history.

(56) References Cited

U.S. PATENT DOCUMENTS

| | | | | |
|---|---|---|---|---|
| D24,178 S | * | 4/1895 | Hoffmann | 30/169 |
| 1,643,336 A | * | 9/1927 | Frost | A47L 17/06 30/169 |
| 1,718,496 A | * | 6/1929 | Smith | A47L 13/08 30/169 |
| 1,841,163 A | * | 1/1932 | Trane | A47L 13/08 30/169 |
| 2,178,019 A | * | 10/1939 | Knuteson | C14B 1/02 30/169 |
| 2,275,713 A | * | 3/1942 | Ahlborg | B60S 3/045 15/236.02 |
| D132,857 S | | 6/1942 | Linenfelser | |
| 2,333,878 A | * | 11/1943 | Nelson | B44D 3/164 30/136 |
| 2,818,642 A | * | 1/1958 | Judd, Jr. | B44D 3/164 30/169 |
| 2,900,656 A | * | 8/1959 | Tupper | A47J 43/288 15/236.06 |
| 2,957,192 A | * | 10/1960 | Faughnder | A47J 43/288 15/236.08 |
| 3,274,684 A | * | 9/1966 | Marks | E01H 5/02 15/236.08 |
| 3,363,316 A | * | 1/1968 | Skarsten | B44C 7/027 15/236.05 |
| 3,397,455 A | | 8/1968 | William | |

(Continued)

OTHER PUBLICATIONS

U.S. Appl. No. 29/817,853, filed Dec. 3, 2021, Eric Georges Duvauchelle.

*Primary Examiner* — Jason Daniel Prone
(74) *Attorney, Agent, or Firm* — Genius Patent APC; Bruce Angus Hare (57) ABSTRACT

A pumpkin scraping and scooping tool is described. The pumpkin scraping and scooping tool may include a body, a handle, a front portion, a rear portion, a right-side portion, and a left-side portion. The body may include a convex top surface and concave bottom surface. The handle may extend from the top surface of the body in an inverted "U" shape. The front portion and/or the rear portion may include a rounded tip. The left-side portion and/or the right-side portion may include wings that protrude from the concave bottom surface. The tool may be used for various purposes, such as carving melons or other fruits, gardening or digging, and/or other appropriate activities.

10 Claims, 10 Drawing Sheets

(56) References Cited

U.S. PATENT DOCUMENTS

| | | | |
|---|---|---|---|
| 3,571,925 A | 3/1971 | Deutschmann | |
| 3,885,271 A * | 5/1975 | Kollander | A47J 17/02 30/136 |
| 4,159,839 A * | 7/1979 | Sigler | A47G 21/02 15/236.01 |
| 4,363,155 A * | 12/1982 | Regina | B60S 3/045 15/236.02 |
| 4,364,145 A * | 12/1982 | Jones | A47L 1/06 15/236.06 |
| 4,449,299 A * | 5/1984 | Mulrooney | B27G 17/04 30/169 |
| 4,574,417 A * | 3/1986 | Magnasco | A47L 13/08 15/236.05 |
| 4,649,849 A * | 3/1987 | McCormick | B63B 59/06 15/236.07 |
| 4,668,302 A * | 5/1987 | Kolodziej | A47J 37/0786 15/236.08 |
| 4,984,324 A * | 1/1991 | Farris | A47L 13/08 15/236.05 |
| D319,374 S * | 8/1991 | Johannsen | D7/689 |
| 5,092,050 A * | 3/1992 | Bardeen | A47J 43/288 30/169 |
| 5,201,121 A * | 4/1993 | Heiberg | A47J 43/288 30/169 |
| 5,435,064 A * | 7/1995 | Brookfield | A47L 13/022 30/169 |
| 5,467,498 A * | 11/1995 | Keegan | A47L 13/08 30/169 |
| 5,471,698 A * | 12/1995 | Francis | A47L 13/08 15/236.02 |
| 5,781,957 A * | 7/1998 | Scholl | A47L 1/16 15/236.08 |
| 6,163,919 A * | 12/2000 | Mitchell | A47L 1/16 30/169 |
| D437,191 S * | 2/2001 | Sofy | D7/688 |
| 6,249,930 B1 * | 6/2001 | Noggle | A47L 13/52 15/257.1 |
| 6,629,331 B2 * | 10/2003 | Panfili | A47L 13/022 30/169 |
| 6,733,056 B2 * | 5/2004 | Daniele | A47J 43/28 30/169 |
| 6,925,675 B1 * | 8/2005 | Trunecek | A47L 1/16 15/236.01 |
| D542,104 S | 5/2007 | Holcomb et al. | |
| D599,628 S * | 9/2009 | Pourounidis | D7/691 |
| 8,286,297 B1 * | 10/2012 | Murray | E04G 21/201 15/236.08 |
| 8,321,989 B1 * | 12/2012 | McClanahan | B44D 3/162 15/236.01 |
| 8,418,307 B1 * | 4/2013 | Rhee | A47L 17/04 15/236.01 |
| 8,832,898 B1 * | 9/2014 | Stimach | A47L 13/02 30/169 |
| D804,746 S * | 12/2017 | Frye | D30/162 |
| 10,137,585 B2 | 11/2018 | Gonterman | |
| D905,512 S * | 12/2020 | Knopfler | D7/691 |
| D929,827 S | 9/2021 | McNall et al. | |
| D932,260 S * | 10/2021 | Jackson, III | D7/691 |
| D1,006,562 S * | 12/2023 | Duvauchelle | D7/693 |
| 2003/0150627 A1 | 8/2003 | Timmons | A01B 1/02 172/377 |
| 2005/0193516 A1 * | 9/2005 | Hughes | A47L 13/08 15/236.07 |
| 2006/0200912 A1 * | 9/2006 | Jackson | B25G 1/102 15/105 |
| 2007/0071843 A1 * | 3/2007 | Jackson | A47J 43/288 30/324 |
| 2007/0163125 A1 * | 7/2007 | Discoe | A47J 17/02 30/169 |
| 2011/0285159 A1 * | 11/2011 | Workman | A47F 13/08 294/178 |
| 2021/0161225 A1 * | 6/2021 | Braithwaite | A41D 19/01 |

* cited by examiner

PUMPKIN SCRAPING AND SCOOPING TOOL

BACKGROUND

Many people may carve pumpkins (e.g., to create jack-o'-lanterns) and/or use the seeds and/or pulp for cooking or other purposes.

Therefore there is a need for a way to easily separate the pumpkin shell from the seeds and pulp.

BRIEF DESCRIPTION OF THE SEVERAL VIEWS OF THE DRAWING

The novel features of the disclosure are set forth in the appended claims. However, for purpose of explanation, several embodiments are illustrated in the following drawings.

DETAILED DESCRIPTION

The following detailed description describes currently contemplated modes of carrying out exemplary embodiments. The description is not to be taken in a limiting sense, but is made merely for the purpose of illustrating the general principles of some embodiments, as the scope of the disclosure is best defined by the appended claims.

Various features are described below that can each be used independently of one another or in combination with other features. Broadly, some embodiments generally provide a pumpkin scraping and scooping tool. Existing tools, such as spoons, saws, and/or other existing tools. may be difficult or unsafe to use, and generally provide unsatisfactory performance (e.g., using a spoon to scrape and scoop may cause pain or soreness in the hand of a user). The pumpkin scraping and scooping tool of some embodiments may allow a user to remove seeds and pulp by separating and removing the seeds and pulp from the shell or skin of the pumpkin. One of ordinary skill in the art will recognize that although various examples and description throughout this disclosure may refer to pumpkins or a pumpkin tool, the same or a similar tool may be used for other types of squash, fruits or melons, and/or other appropriate foods or objects. Further, the tool may be used for other purposes, such as digging soil in a garden and/or other appropriate activities.

Figure 1:
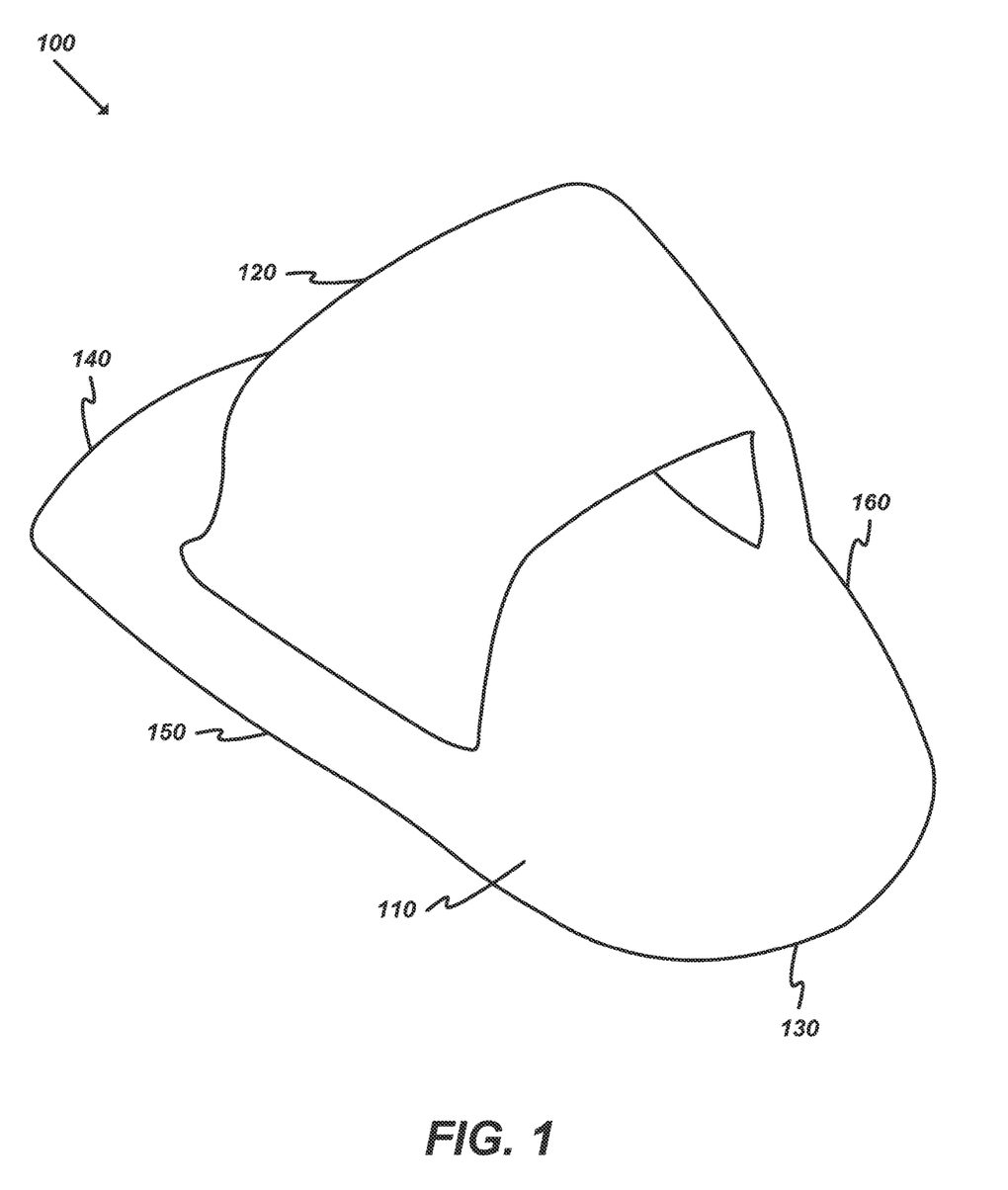
FIG. 1 illustrates a top, front, right perspective view of a pumpkin scraping and scooping tool of one or more embodiments described herein.

FIG. 1 illustrates a top, front, right perspective view of a pumpkin scraping and scooping tool 100 of one or more embodiments described herein. As shown, the pumpkin scraping and scooping tool 100 may include a main body or "scoop" 110, a handle 120, a leading or front portion 130, a trailing or rear portion 140, a proximate or right-side portion 150, and a distal or left-side portion 160.

Pumpkin scraping and scooping tool 100 may include various rigid materials or compounds (e.g., plastic, glass, metal, wood, and/or other appropriate materials.). In some embodiments, pumpkin scraping and scooping tool 100 may include components or portions that include pliable materials or compounds (e.g., silicone, rubber, plastic, and/or other appropriate materials.). For example, some embodiments may include silicone or rubber bumps that provide non-slip gripping surfaces for a user.

The pumpkin scraping and scooping tool 100 components may be formed as a single element (e.g., molded plastic, cast metal, carved wood, and/or other appropriate elements.) and/or components may be coupled together in various ways (e.g., a metal portion may be coupled to a plastic portion using screws, bolts, adhesives, and/or other appropriate elements).

Scoop 110 may include and/or be coupled to the various other elements of pumpkin scraping and scooping tool 100. Scoop 110 may include a convex top or "upper" surface and a concave bottom or "lower" surface, where only the upper surface is visible in this view. The top and bottom surfaces may be generally smooth, curving along one or more axes. The bottom surface may have a bowl-like rounded or oval shape and the top surface may be curved to fit comfortably in the hand of a user. Scoop 110 may taper from a wider rear portion 140 to a narrower front portion 130 in some embodiments. Scoop 110 will be described in more detail in reference to FIG. 9 below.

Returning to FIG. 1, handle 120 may extend upward in an inverted "U" shape from the body 110. Handle 120 may taper (e.g., be wider toward rear portion 140 and narrower toward front portion 130). Handle 120 may include and/or otherwise be associated with various other user engagement features, such as one or more knobs, straps, grips, and/or other appropriate engagement features. Handle 120 will be described in more detail in reference to FIG. 10, FIG. 11, and FIG. 12 below.

Returning to FIG. 1, front portion 130 may have a generally elliptical curved shape as shown. Front portion 130 may include a "tip" having a rounded point. Front portion 130 may serve as a scraping tool when the pumpkin scraping and scooping tool 100 is pulled toward a user while seeds and pulp are collected in the bowl formed by the bottom surface of scoop 110. Front portion 130 will be described in more detail in reference to FIG. 8 below.

Returning to FIG. 1, rear portion 140 may be similar to front portion 130, having a generally rounded shape and, in some embodiments, a tip or rounded point. Rear portion 140 may serve as a scraping tool while seeds and pulp are collected in the bowl formed by the bottom surface of scoop 110. Rear portion 140 may be wider than front portion 130 and may be used to scrape or scoop larger sections of pumpkin than front portion 130.

Front portion 130 and/or rear portion 140 may be used to excavate soil or other materials while gardening or performing other such activities. Soil and/or other materials may be collected in the bowl formed by the bottom surface of scoop 110.

Right-side portion 150 may have a curved, tapered shape extending from front portion 130 to rear portion 140 forming a first curved edge along right-side portion 150 that extends from the bottom surface of scoop 110. Right-side (or "proximate") portion 150 may be a "blade edge" along the first curved edge, allowing right-side portion 150 to serve as a scraping tool while seeds and pulp are collected in the bowl formed by the bottom surface of scoop 110. Left-side (or "distal") portion 160 may be similar to, and symmetrical to, right-side portion 150 and may include a second curved edge that is a blade edge as shown. In this example, the blade edges are shown as having a flat, non-serrated edge. In some embodiments, the blade edge(s) may include at least one serrated portion. The edge of each blade may be smoother or rounded for safety.

The right-side portion 150 and/or left-side portion 160 may be used to cut (and/or saw) through roots or other such materials while gardening or digging.

Figure 2:
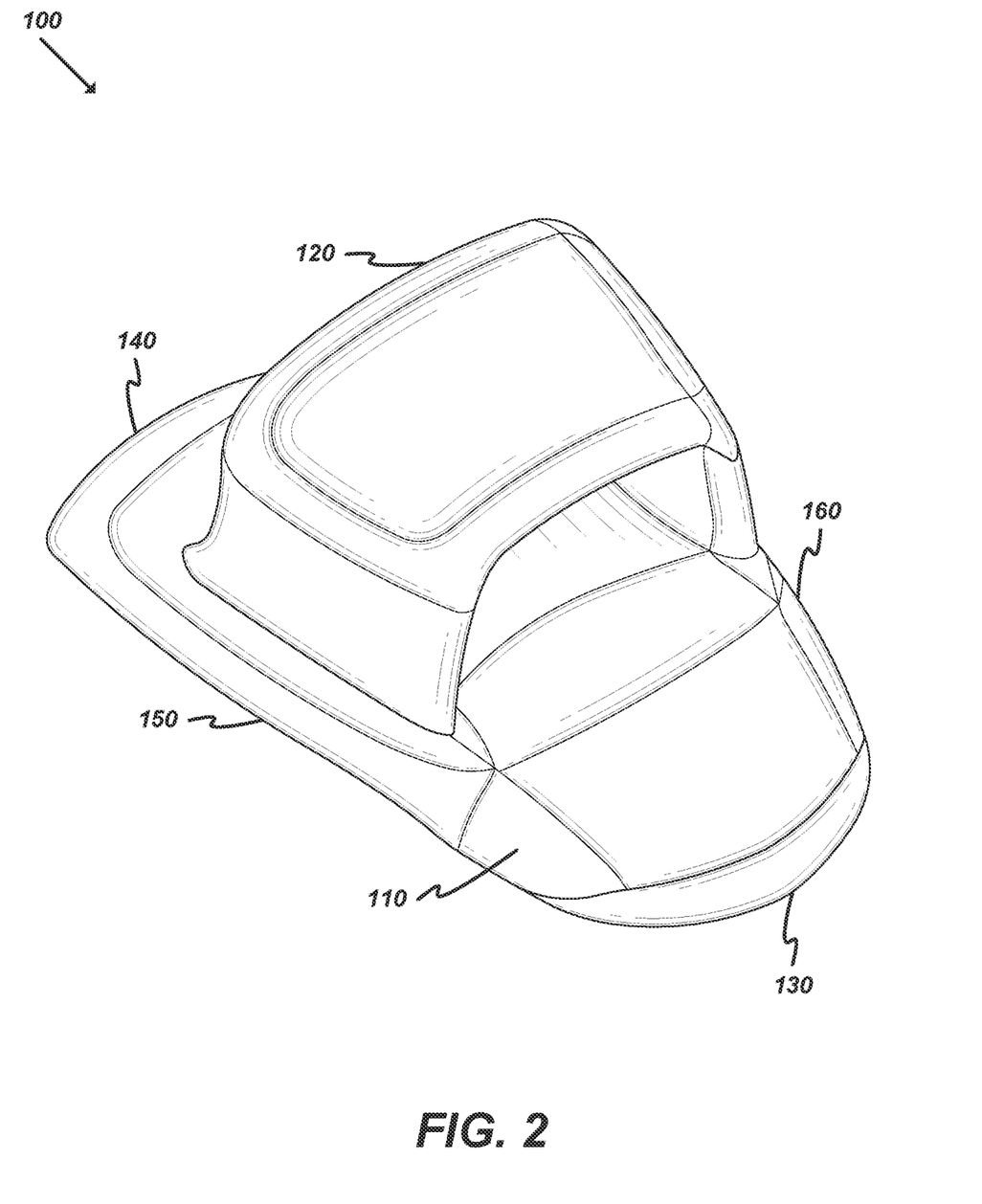
FIG. 2 illustrates a top, front, right perspective view of the pumpkin scraping and scooping tool of FIG. 1 including tangent lines and contour shading.

FIG. 2 illustrates a top, front, right perspective view of the pumpkin scraping and scooping tool 100 including tangent lines and contour shading. Such tangent lines are provided to clearly show the shape of the pumpkin scraping and scooping tool 100 and one of ordinary skill in the art will recognize that such surfaces (e.g., the top surface of scoop 110) may be smooth, with no indentations or protrusions associated with the tangent lines.

Figure 3:
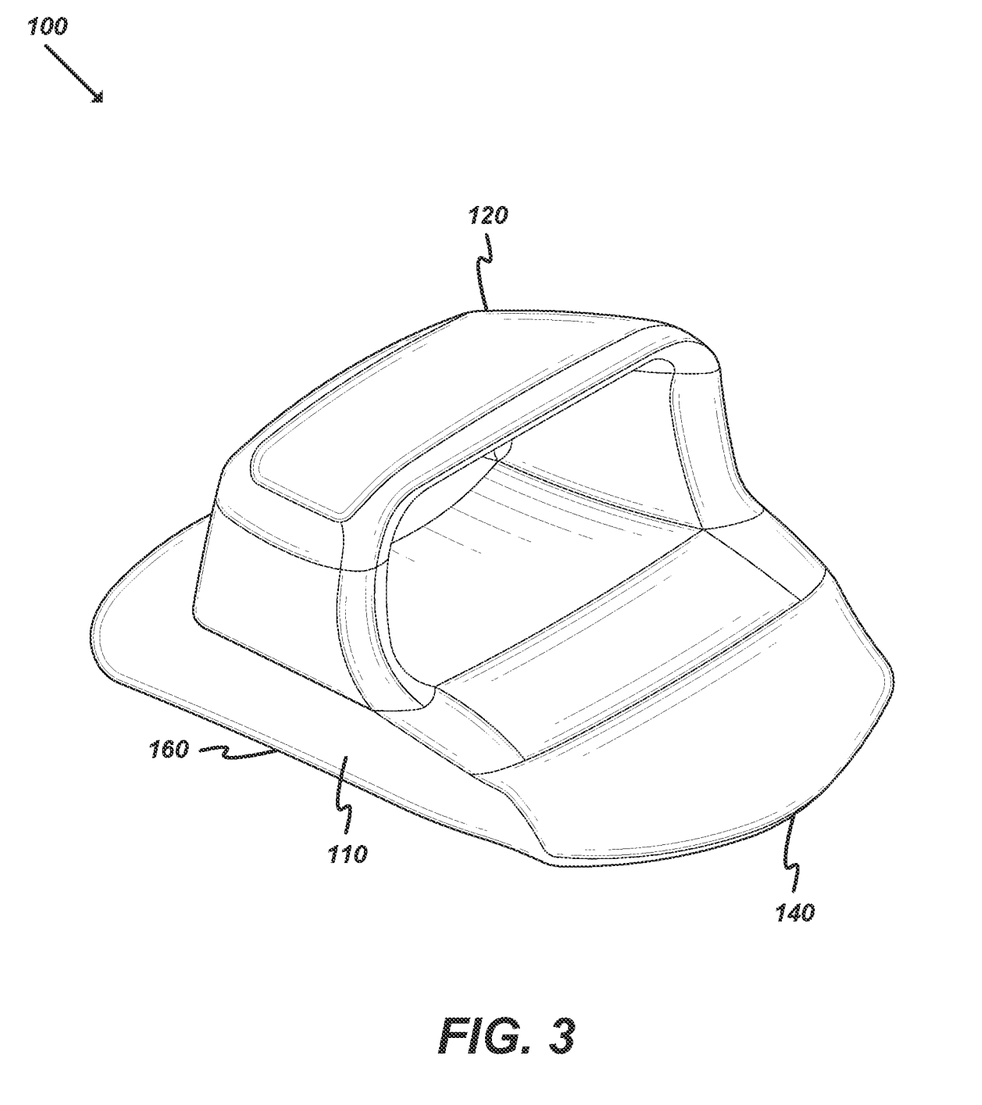
FIG. 3 illustrates a top, rear, left perspective view of the pumpkin scraping and scooping tool of FIG. 1.
Figure 4:
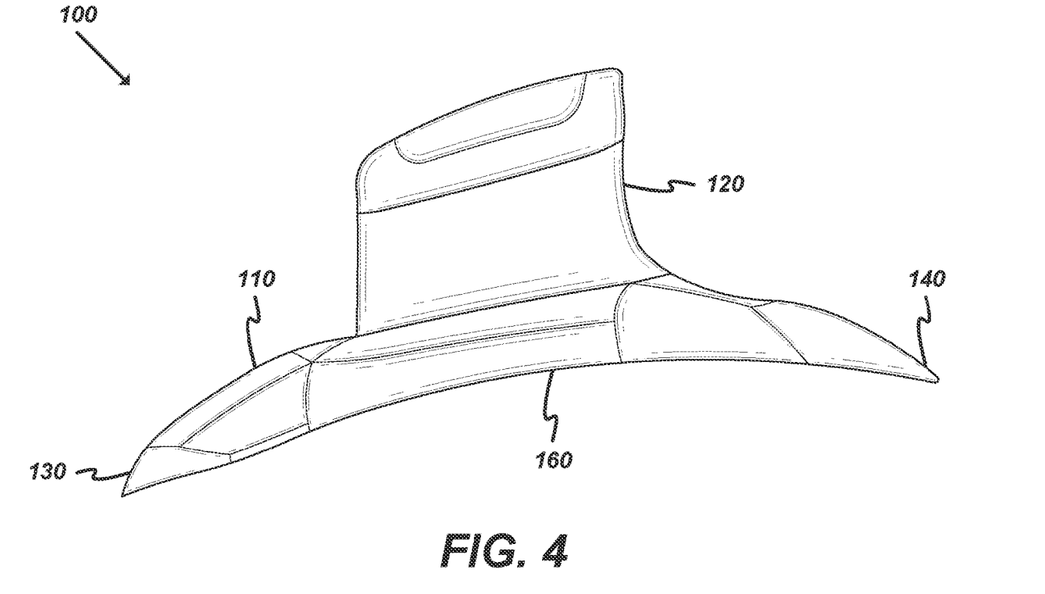
FIG. 4 illustrates a left-side elevation view of the pumpkin scraping and scooping tool of FIG. 1.
Figure 5:
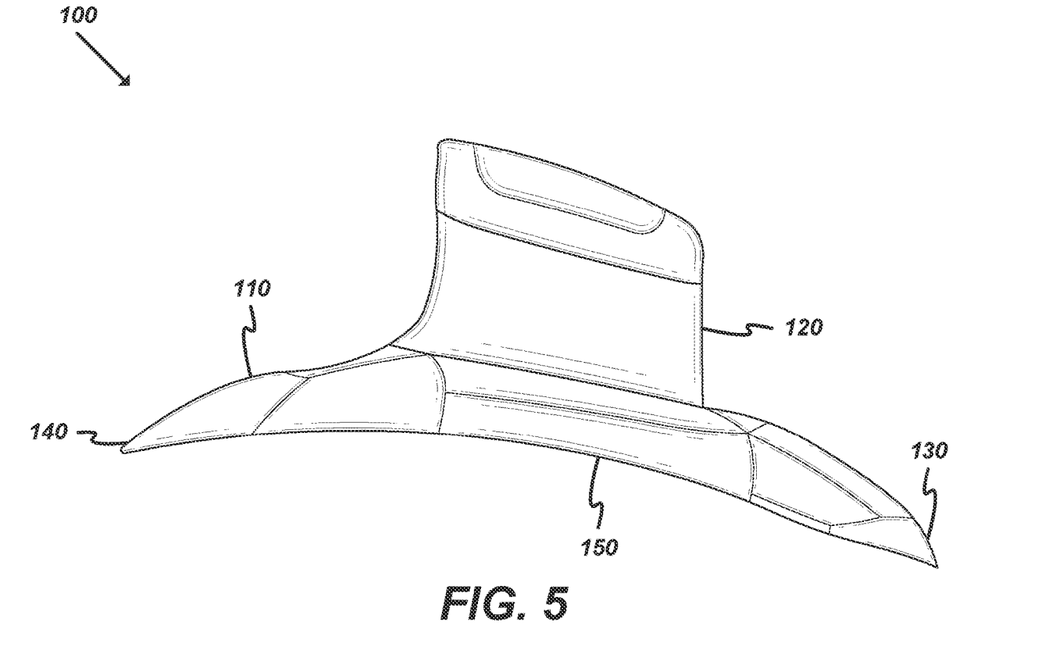
FIG. 5 illustrates a right-side elevation view of the pumpkin scraping and scooping tool of FIG. 1.
Figure 6:
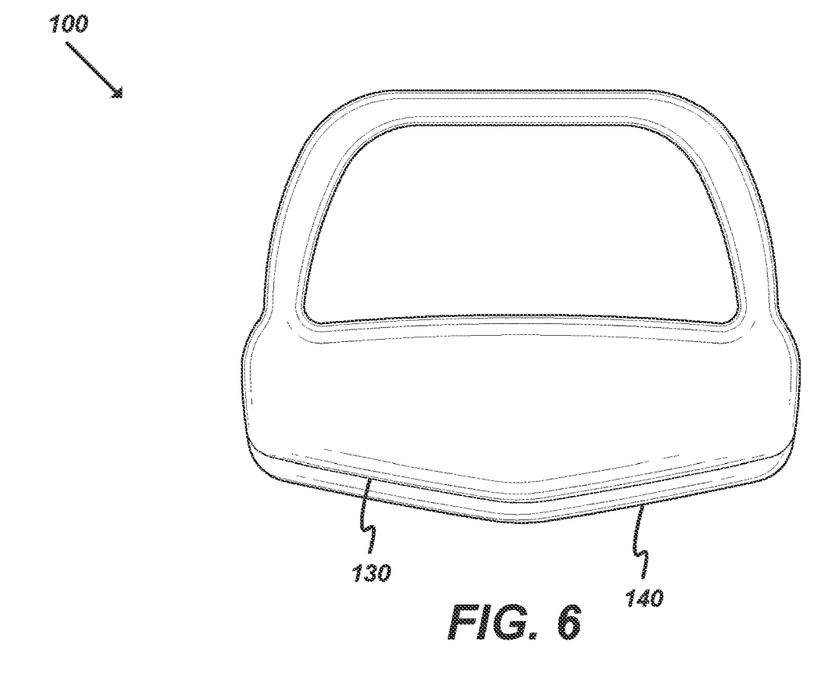
FIG. 6 illustrates a front elevation view of the pumpkin scraping and scooping tool of FIG. 1.
Figure 7:
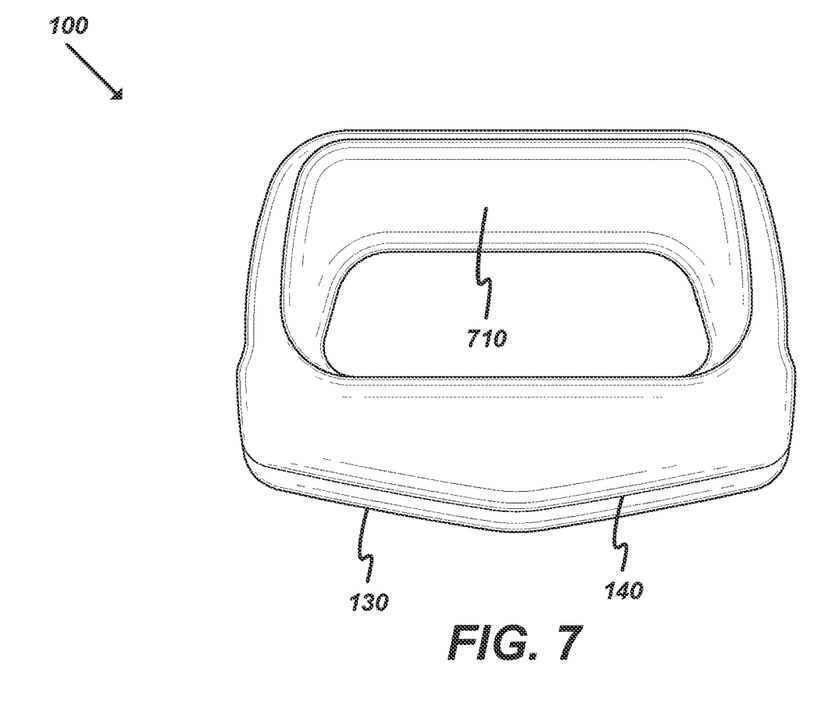
FIG. 7 illustrates a rear elevation view of the pumpkin scraping and scooping tool of FIG. 1.

FIG. 3 illustrates a top, rear, left perspective view of the pumpkin scraping and scooping tool 100. FIG. 4 illustrates a left-side elevation view of the pumpkin scraping and scooping tool 100. FIG. 5 illustrates a right-side elevation view of the pumpkin scraping and scooping tool 100. FIG. 6 illustrates a front elevation view of the pumpkin scraping and scooping tool 100. FIG. 7 illustrates a rear elevation view of the pumpkin scraping and scooping tool 100. As shown, handle 120 may include a smooth, curved inner wall 710.

Figure 8:
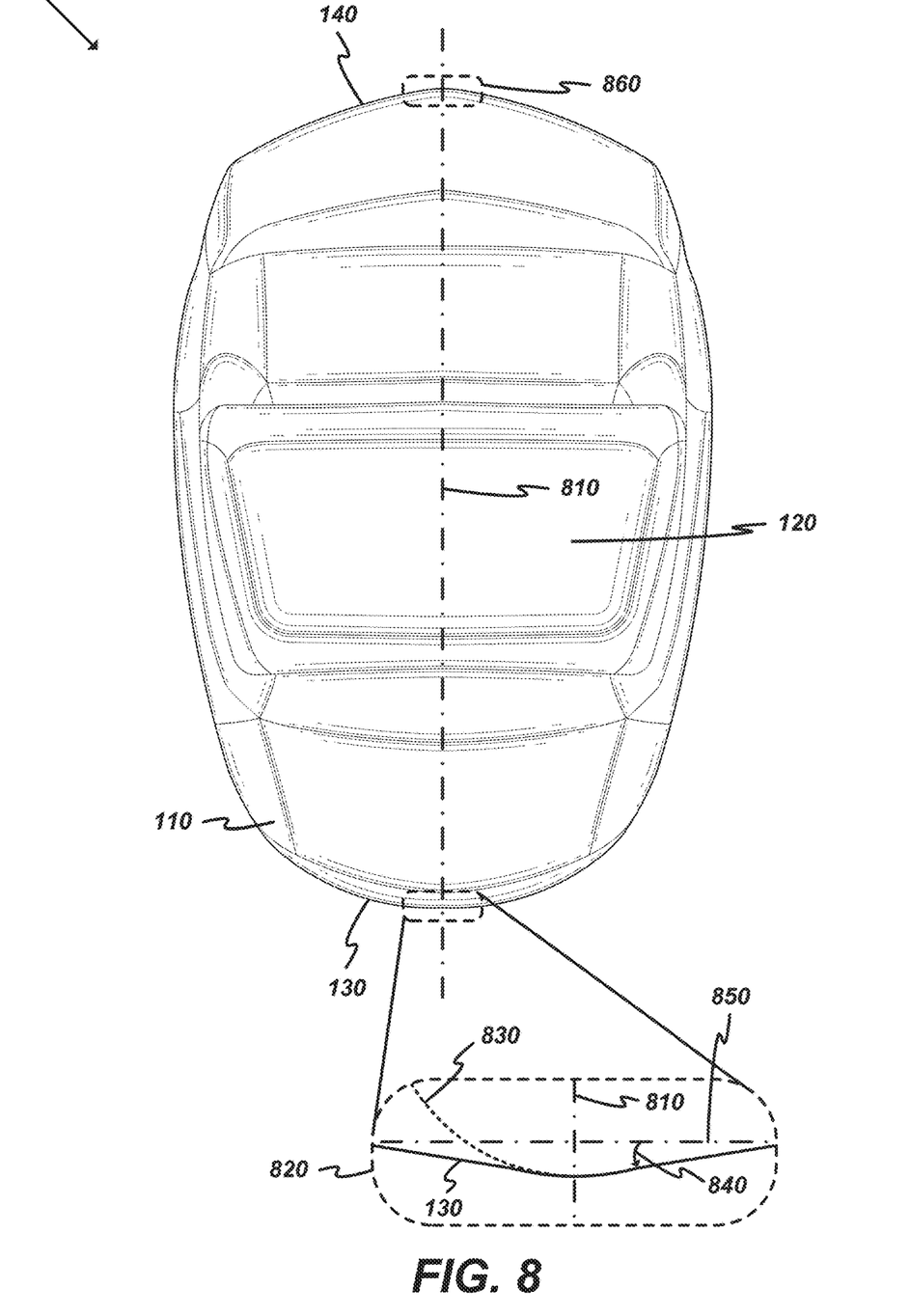
FIG. 8 illustrates a top plan view of the pumpkin scraping and scooping tool of FIG. 1.

FIG. 8 illustrates a top plan view of the pumpkin scraping and scooping tool 100. As shown, in this example pumpkin scraping and scooping tool 100 is symmetrical about a center axis 810. As shown in blown-up section 820, the tip of front portion 130 may be defined by an arc 830, and an acute angle 840 relative to axis 850 (which is perpendicular to center axis 810). Existing tools, such as spoons, with rounded or oval shapes are not as effective at removing material as the pointed tip of some embodiments. For safety, the point may be rounded or smoothed.

In this example, the tip of front portion 130 may include a point formed by linear segments symmetrical to center axis 810 extending from reference axis 850 at acute angle 840 as shown. In order to dull the sharp point that would be formed by the intersection of the symmetrical linear segments, the tip may be rounded to conform to arc 830.

The acute angle 840 may range from five to thirty degrees in some embodiments. In a preferred embodiment, the acute angle 840 may be ten degrees.

The radius of arc 830 may be thirty to forty percent of the width of the pumpkin scraping and scooping tool 100 in some embodiments. Similarly, the radius of arc 830 may be twenty to twenty-five percent of the length of the pumpkin scraping and scooping tool 100.

Rear portion 140 may be similarly configured to, and larger than, front portion 130 and may include a tip or rounded point 860.

The front portion 130, rear portion 140, and/or associated tips or points may have various different shapes or configurations without departing from the scope of the disclosure. For instance, the tips may have sharper, less rounded points.

Figure 9:
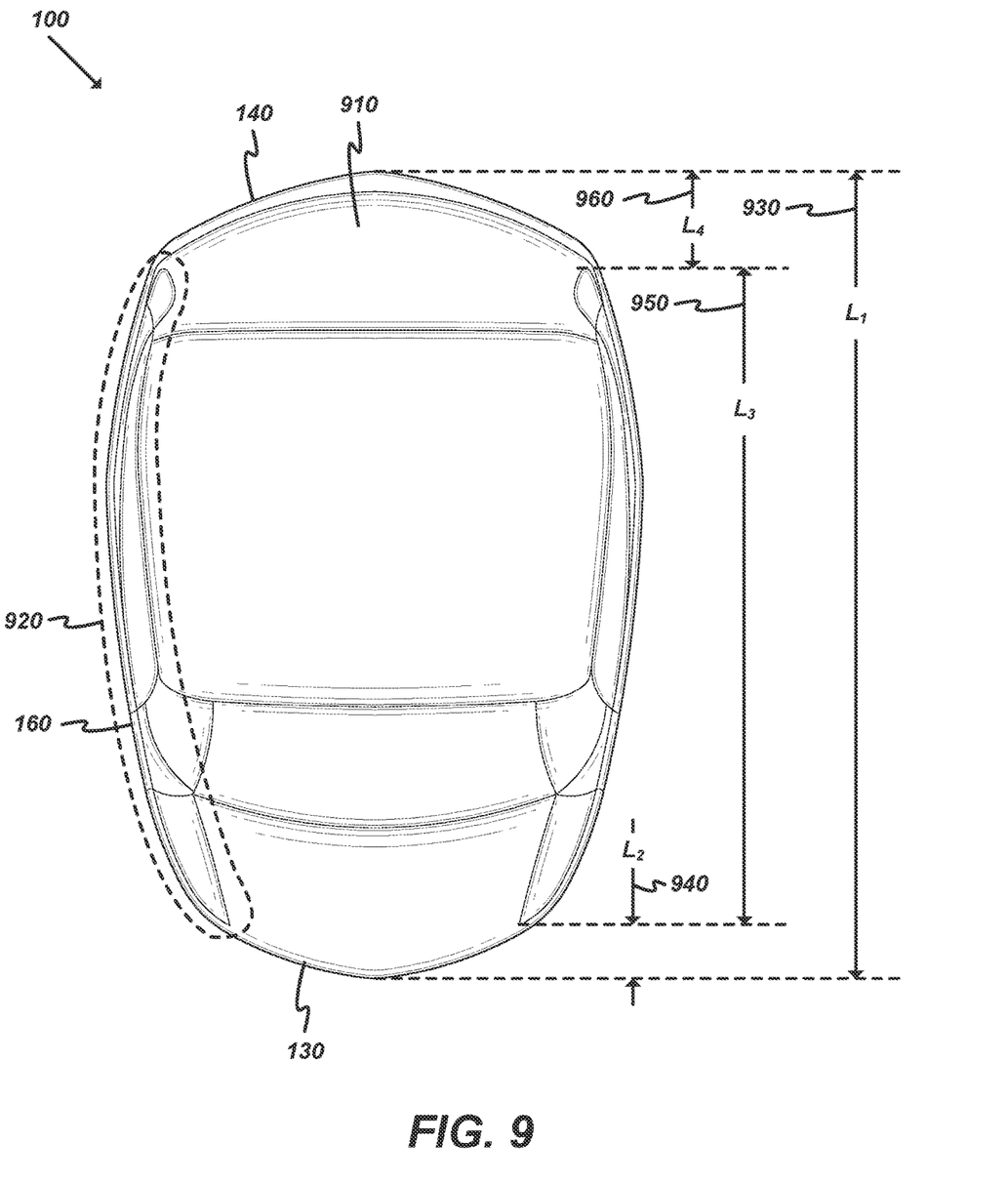
FIG. 9 illustrates a bottom plan view of the pumpkin scraping and scooping tool of FIG. 1.

FIG. 9 illustrates a bottom plan view of the pumpkin scraping and scooping tool 100. In this view the bottom surface 910 of scoop 110 is visible. In addition, each blade or wing, such as the wing 920 associated with left-side portion 160, is shown.

The total length, $L_1$ 930, of the pumpkin scraping and scooping tool 100 may be three and one-half inches to five and one-half inches along center axis 810 in some embodiments. In a preferred embodiment, the total length, $L_1$ 930, may be four and three-eighths inches, within appropriate tolerances (e.g., plus or minus one eighth inch).

The front portion 130 length, $L_2$ 940, of the pumpkin scraping and scooping tool 100 may be one-quarter to three-quarters of an inch along center axis 810 in some embodiments. In a preferred embodiment, the front portion 130 length, $L_2$ 940, may be three-eighths of an inch, within appropriate tolerances (e.g., plus or minus one sixteenth inch).

The blade length, $L_3$ 950, as measured in a straight line parallel to center axis 810 may be two and three-quarters to four and one-half inches in some embodiments. In a preferred embodiment, the blade length, $L_3$ 950, may be three and one-half inches, within appropriate tolerances (e.g., plus or minus one eighth inch).

The rear portion 140 length, $L_4$ 960, of the pumpkin scraping and scooping tool 100 may be one-quarter to three-quarters of an inch along center axis 810 in some embodiments. In a preferred embodiment, the rear portion 150 length, $L_4$ 960, may be one-half inch, within appropriate tolerances (e.g., plus or minus one sixteenth inch).

Figure 10:
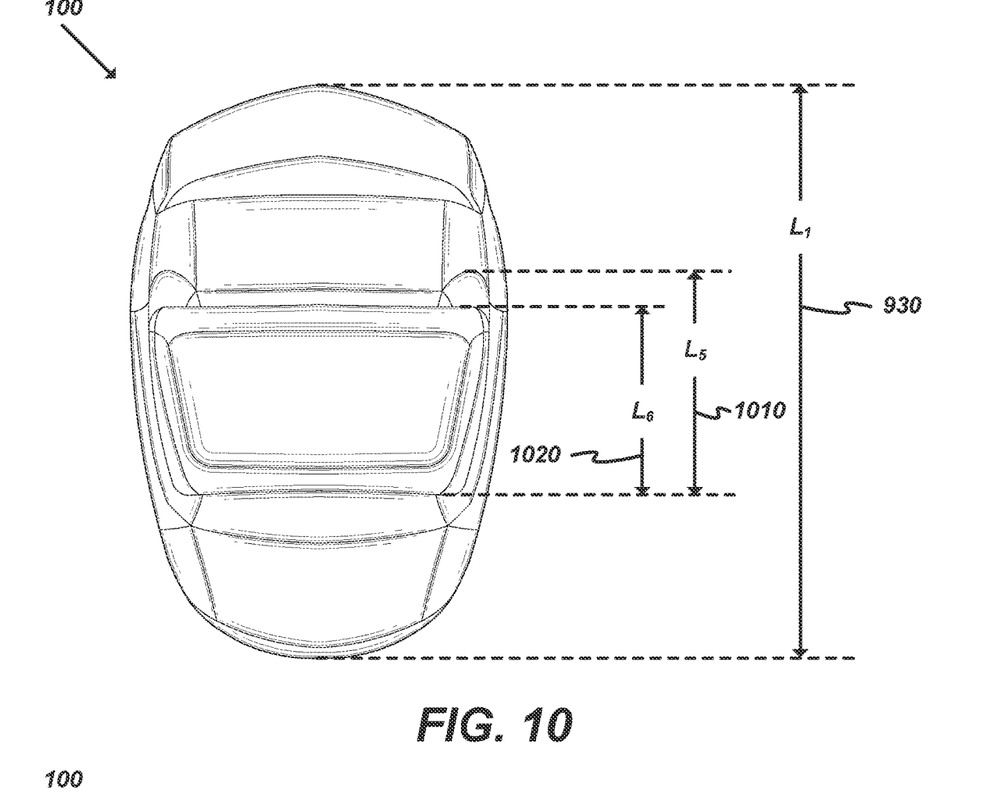
FIG. 10 illustrates another top plan view of the pumpkin scraping and scooping tool of FIG. 1.

FIG. 10 illustrates another top plan view of the pumpkin scraping and scooping tool 100.

The handle base length, $L_5$ 1010, as measured in a straight line parallel to center axis 810, may be one and one-quarter to two inches in some embodiments. In a preferred embodiment, the handle base length, $L_5$ 1010, may be one and five-eighths inches, within appropriate tolerances (e.g., plus or minus one sixteenth inch).

The handle peak length, $L_6$ 1020, as measured in a straight line parallel to center axis 810, may be one and one-eighth to one and fifteen-sixteenths inches in some embodiments. In a preferred embodiment, the handle peak length, $L_6$ 1020, may be one and seven-sixteenths inches, within appropriate tolerances (e.g., plus or minus one sixteenth inch).

Figure 11:
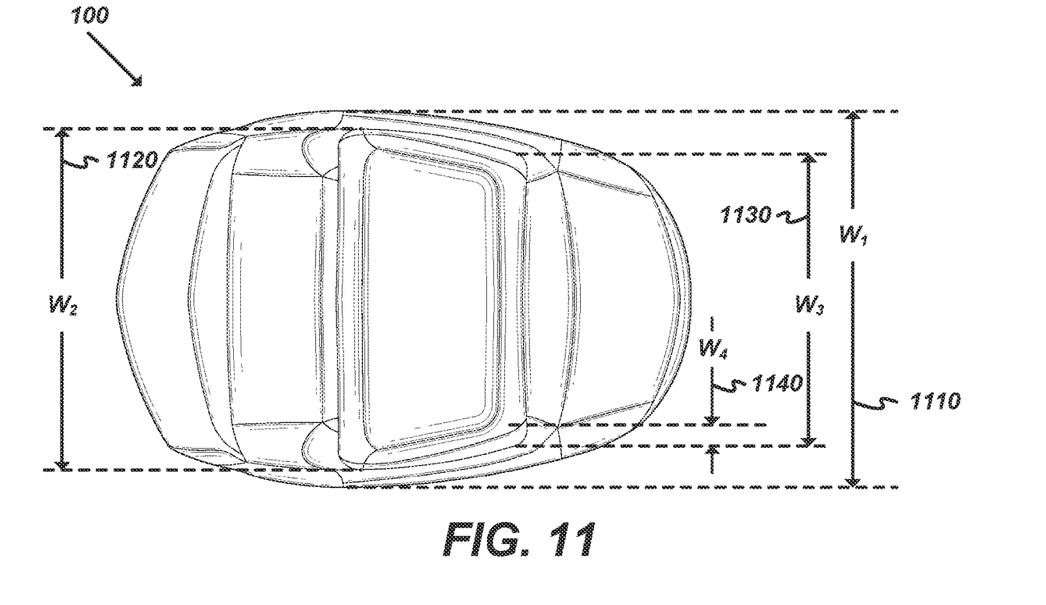
FIG. 11 illustrates a differently oriented top plan view of the pumpkin scraping and scooping tool of FIG. 1.

FIG. 11 illustrates a differently oriented top plan view of the pumpkin scraping and scooping tool 100.

In some embodiments, the total width, $W_1$ 1110, of the pumpkin scraping and scooping tool 100 may be two and one-quarter to three inches, as measured in a straight line perpendicular to center axis 810 at the widest point of pumpkin scraping and scooping tool 100. In a preferred embodiment, the total width, $W_1$ 1110, may be two and three-quarters inches, within appropriate tolerances (e.g., plus or minus one eighth inch).

The handle rear base width, $W_2$ 1120, as measured in a straight line perpendicular to center axis 810, may be two to two and three-quarters inches. In a preferred embodiment, the handle rear base width, $W_2$ 1120, may be two and one-half inches, within appropriate tolerances (e.g., plus or minus one eighth inch).

The handle front base width, $W_3$ 1130, as measured in a straight line perpendicular to center axis 810, may be one and three-quarters to two and one-half inches. In a preferred embodiment, the handle front base width, $W_3$ 1130, may be two and one-eighth inches, within appropriate tolerances (e.g., plus or minus one eighth inch).

The handle base thickness, $W_4$ 1140, may be between one-sixteenth and one-quarter inch. In a preferred embodiment, the handle base thickness, $W_4$ 1140, may be one-eighth inch, within appropriate tolerances (e.g., plus or minus one sixteenth inch). The handle thickness may vary along the handle 120 (e.g., the handle thickness may be greater toward the handle base and lesser toward the handle peak). The handle thickness may taper, for instance, by being thinner toward the edges of the handle 120 and thicker toward the center of the handle 120.

Figure 12:
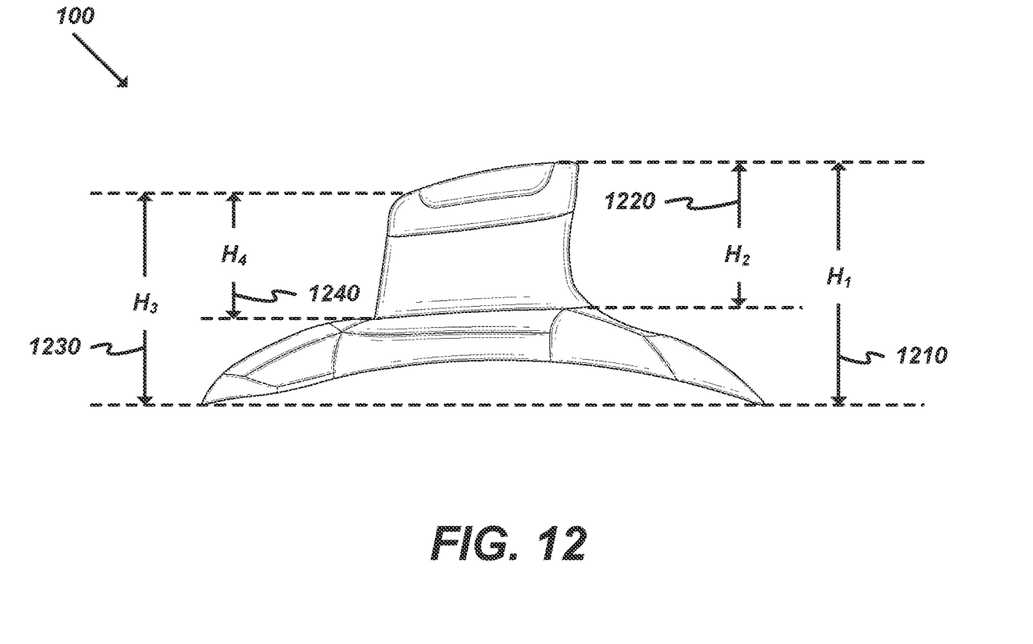
FIG. 12 illustrates another left-side elevation view of the pumpkin scraping and scooping tool of FIG. 1.

FIG. 12 illustrates another left-side elevation view of the pumpkin scraping and scooping tool 100.

In some embodiments, the total height, $H_1$ 1210, of the pumpkin scraping and scooping tool 100, may be one and one-half inches to two and one-half inches, as measured in a straight line perpendicular to center axis 810 at the tallest point of pumpkin scraping and scooping tool 100 as shown. In a preferred embodiment, the total height, $H_1$ 1210, may be one and seven-eighths inches, within appropriate tolerances (e.g., plus or minus one sixteenth inch).

The handle rear height, $H_2$ 1220, associated with a rear portion of the handle 120, and as measured in a straight line perpendicular to center axis 810, may be three-quarters to one and one-half inches. In a preferred embodiment, the handle rear height, $H_2$ 1220, may be one and one-eighth inches, within appropriate tolerances (e.g., plus or minus one sixteenth inch).

The handle height, $H_3$ 1230, as measured in a straight line perpendicular to center axis 810, may be one and one-quarter to two and one-quarter inches. In a preferred embodiment, the handle height, $H_3$ 1230, may be one and five-eighths inches, within appropriate tolerances (e.g., plus or minus one sixteenth inch).

The handle front height, $H_4$ 1240, associated with a front portion of the handle 120, and as measured in a straight line perpendicular to center axis 810, may be five-eighths to one and three-eighths inches. In a preferred embodiment, the handle rear height, $H_4$ 1240, may be seven-eighths inches, within appropriate tolerances (e.g., plus or minus one sixteenth inch).

Figure 13:
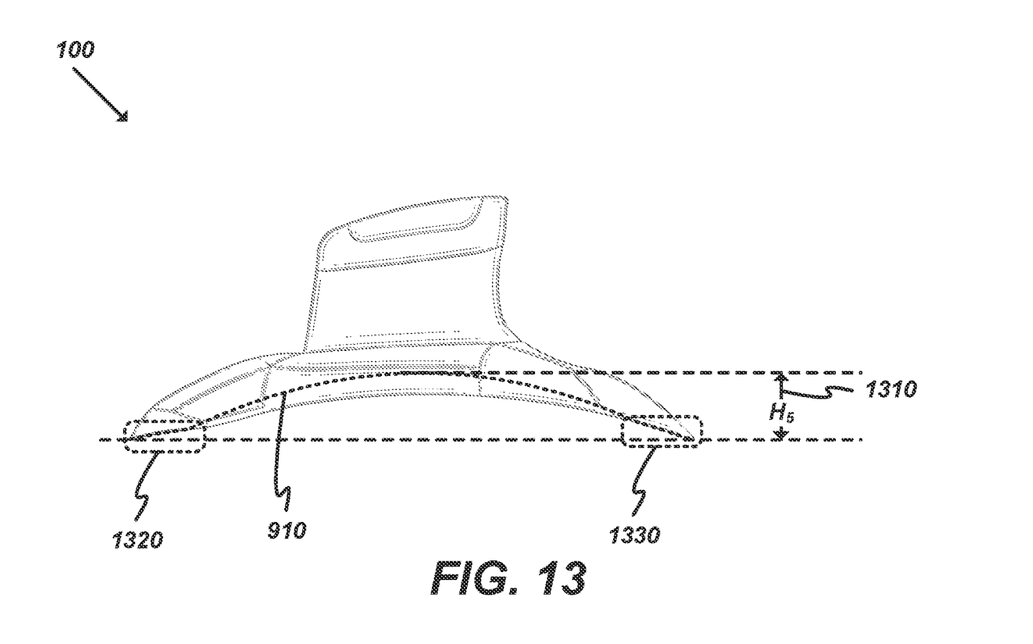
FIG. 13 illustrates another left-side elevation view of the pumpkin scraping and scooping tool of FIG. 1.

FIG. 13 illustrates another left-side elevation view of the pumpkin scraping and scooping tool 100.

In this example, the concave bottom surface 910 of the scoop bowl is shown with reference to the top, convex, surface of pumpkin scraping and scooping tool 100. As shown, the first curved edge along right-side (or "proximate") portion 150 and the second curved edge along left-side (or "distal") portion 160 may define the convex shape of the top surface of pumpkin scraping and scooping tool 100 and the concave shape of the bottom surface 910.

The scoop height, $H_5$ 1310, as measured in a straight line perpendicular to center axis 810, may be one-quarter to three-quarters inches. In a preferred embodiment, the scoop height, $H_5$ 1310, may be one-half inch, within appropriate tolerances (e.g., plus or minus one sixteenth inch).

A front section 1320 of the bottom surface 910 may be smooth across the width of the pumpkin scraping and scooping tool 100 (e.g., the wings associated with the left-side portion 160 and right-side portion 150 may not extend to front section 1320).

A rear section 1330 of the bottom surface 910 may be smooth across the width of the pumpkin scraping and scooping tool 100 (e.g., the wings associated with the left-side portion 160 and right-side portion 150 may not extend to rear section 1330).

One of ordinary skill in the art will recognize that although the attributes of pumpkin scraping and scooping tool 100 have been described by reference to various specific examples, such attributes may vary without departing from the scope of the disclosure. For instance, different embodiments may have differently sized components than those described (e.g., longer, shorter, wider, narrower, thicker, thinner, and/or otherwise appropriately sized.). Ratios associated with various preferred embodiments and/or other examples described above (e.g., $L_3:L_1$, $L_2:L_1$, among other examples) may be applied to various differently sized embodiments (e.g., longer or shorter than the examples provided), within appropriate tolerances (e.g., plus or minus one percent, five percent, and/or other appropriate tolerances.). As another example, although the examples above have illustrated a formed or molded pumpkin scraping and scooping tool 100, the pumpkin scraping and scooping tool 100 may include various structural and/or support members (e.g., a skeletal frame) that may be at least partially covered or housed by external panels, sleeves, and/or other exterior features.

Figure 14:
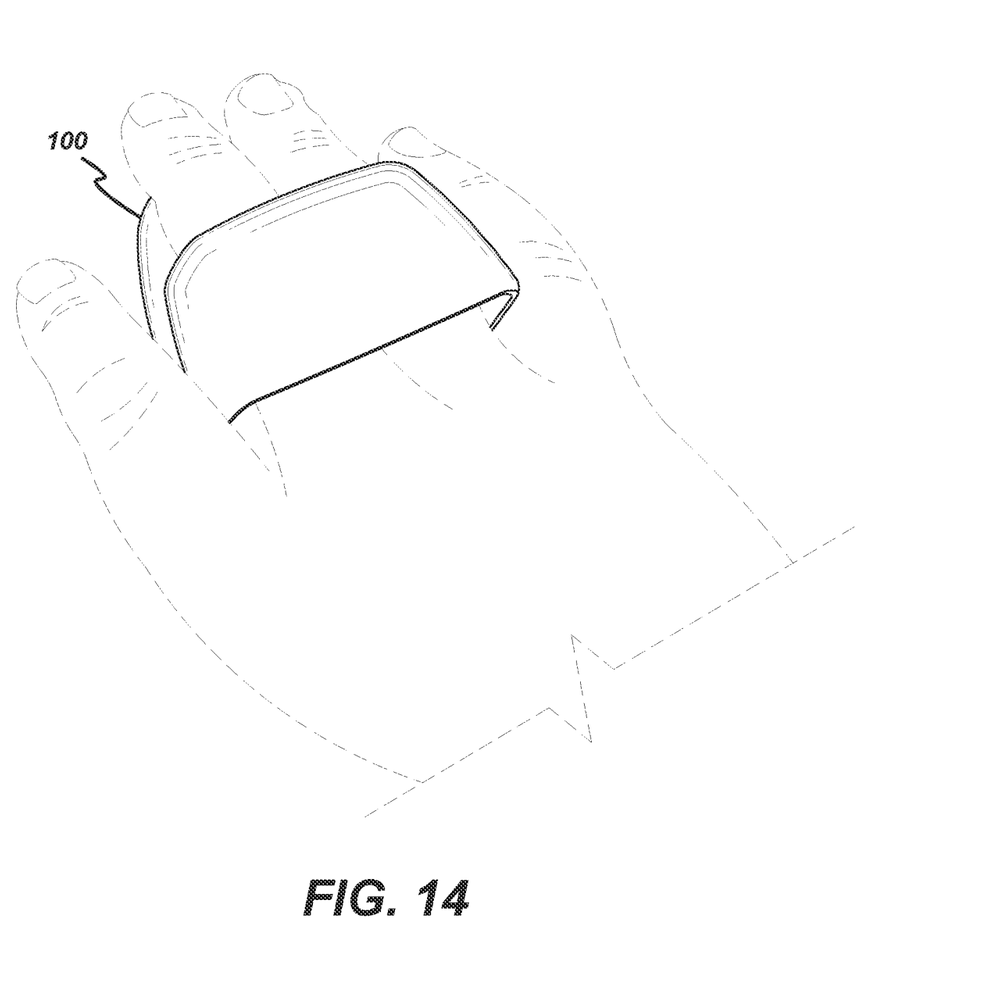
FIG. 14 illustrates a top, rear, left perspective view of the pumpkin scraping and scooping tool of FIG. 1 during use.

FIG. 14 illustrates a top, rear, left perspective view of the pumpkin scraping and scooping tool 100 during use. In this example, a user has inserted the middle two fingers into handle 120, with the front portion 130 oriented away from the user.

Pumpkin scraping and scooping tool 100 may be used in various orientations or configurations. For example, the rear portion 140 may be used as a leading edge when scraping or scooping. As another example, rather than sliding fingers through the handle opening as shown, a user may grasp a portion of the handle 120 (e.g., between thumb and forefinger) and manipulate the pumpkin scraping and scooping tool 100 in various ways (e.g., by scraping away material using the blades of left-side portion 160 or right-side portion 150).

Because the pumpkin scraping and scooping tool 100 may be used in various orientations (e.g., allowing forward, backward, sideways, and/or other appropriate movement directions), the pumpkin scraping and scooping tool 100 may fit into small interior spaces and may be able to easily remove more seeds and pulp from such interior spaces than existing tools.

The pumpkin scraping and scooping tool 100 may be optimized for use by various different users. For instance, a user with relatively large hands may insert the middle two fingers into the handle 120 as shown. A user with relatively small hands may insert three (or more fingers) into the handle 120.

The top surface of scoop 110 may be curved to match the hand of a user such that the pumpkin scraping and scooping tool 100 may be used comfortable for longer periods of time than existing tools (e.g., grasping a spoon handle will quickly tire the hand muscles of a user).

During use, a user may start by scraping from front to back, removing material mainly with the front portion 130 and scoop 110. As more material is removed, the user may scrape away fibers using the blades of left-side portion 160 and/or right-side portion 150.

The various edges or blades of pumpkin scraping and scooping tool 100 may be sharp enough to remove pulp or other materials but not sharp enough to penetrate the skin of a user in some embodiments.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items and may be used interchangeably with the phrase "one or more." Where only one item is intended, the terms "one," "single," "only," or similar language is used. Further, the phrase "based on" is intended to mean "based, at least in part, on" unless explicitly stated otherwise.

The foregoing relates to illustrative details of exemplary embodiments and modifications may be made without departing from the scope of the disclosure. Even though particular combinations of features are recited in the claims and/or disclosed in the specification, these combinations are not intended to limit the possible implementations of the disclosure. In fact, many of these features may be combined in ways not specifically recited in the claims and/or disclosed in the specification. For instance, although each dependent claim listed below may directly depend on only one other claim, the disclosure of the possible implementations includes each dependent claim in combination with every other claim in the claim set.

I claim:

1. A scraping and scooping tool comprising:
a scoop body with a first surface having a concave shape and an opposite second surface having a convex shape, the first surface and the second surface defining a front portion, a rear portion, a proximate portion, and a distal potion, wherein the proximate portion comprises a first curved edge and the distal portion comprises a second curved edge, wherein the first curved edged and the second curved edge define the concave shape and the convex shape; and
a handle coupled to the second surface.

2. The scraping and scooping tool of claim 1, wherein the handle is U-shaped.

3. The scraping and scooping tool of claim 1, wherein the front portion comprises a rounded point.

4. The scraping and scooping tool of claim 3, wherein the rear portion comprises a rounded point.

5. The scraping and scooping tool of claim 4, wherein at least one of the first curved edge or the second curved edge is a blade edge.

6. A scraping and scooping tool comprising:
a body comprising:
a first surface having a concave shape; and
an opposite second surface having a convex shape, wherein the first surface and the second surface define:
a front portion;
a rear portion;
a proximate portion, wherein the proximate portion comprises a first curved edge; and
a distal portion, wherein the distal portion comprise a second curved edge,
wherein the first curved edged and the second curved edge define the concave shape and the convex shape, and
wherein the first surface and the second surface taper such that the front portion is narrower than the rear portion; and
a handle coupled to the second surface.

7. The scraping and scooping tool of claim 6, wherein the handle is U-shaped.

8. The scraping and scooping tool of claim 6, wherein the front portion comprises a rounded point.

9. The scraping and scooping tool of claim 8, wherein the rear portion comprises a rounded point.

10. The scraping and scooping tool of claim 9, wherein at least one of the first curved edge or the second curved edge is a blade edge.

* * * * *